US007994279B2

(12) United States Patent
Quinn

(10) Patent No.: US 7,994,279 B2
(45) Date of Patent: Aug. 9, 2011

(54) ALTERED PEPTIDE LIGANDS OF GAD65

(75) Inventor: Anthony Quinn, Sylvania, OH (US)

(73) Assignee: The University of Toledo, Toledo, OH (US)

( * ) Notice: Subject to any disclaimer, the term of this patent is extended or adjusted under 35 U.S.C. 154(b) by 203 days.

(21) Appl. No.: 12/295,793

(22) PCT Filed: Mar. 30, 2007

(86) PCT No.: PCT/US2007/008980

§ 371 (c)(1),
(2), (4) Date: Oct. 29, 2008

(87) PCT Pub. No.: WO2007/114959

PCT Pub. Date: Oct. 11, 2007

(65) Prior Publication Data

US 2009/0305340 A1 Dec. 10, 2009

Related U.S. Application Data

(60) Provisional application No. 60/789,236, filed on Apr. 4, 2006.

(51) Int. Cl.

| | |
|---|---|
| ***A61K 39/00*** | (2006.01) |
| ***A61K 39/04*** | (2006.01) |
| ***C07K 5/00*** | (2006.01) |
| ***C07K 17/00*** | (2006.01) |

(52) U.S. Cl. .................................... 530/328; 424/185.1

(58) Field of Classification Search ........................ None
See application file for complete search history.

(56) References Cited

U.S. PATENT DOCUMENTS

| | | | | |
|---|---|---|---|---|
| 5,821,334 | A | 10/1998 | Powers | |
| 5,846,740 | A * | 12/1998 | Tobin et al. | 435/7.4 |
| 5,849,506 | A | 12/1998 | Baekkeskov et al. | |
| 5,968,757 | A | 10/1999 | Powers | |
| 6,060,593 | A | 5/2000 | Powers | |
| 6,093,396 | A | 7/2000 | Falorni et al. | |
| 6,866,843 | B2 | 3/2005 | Habener et al. | |
| 2003/0228258 | A1 * | 12/2003 | Scheinberg et al. | 424/1.69 |
| 2005/0004001 | A1 | 1/2005 | Harris et al. | |
| 2005/0152914 | A1 | 7/2005 | Harris et al. | |
| 2005/0209138 | A1 | 9/2005 | Harris et al. | |

OTHER PUBLICATIONS

Masewicz et al., Modulation of T Cell Response to HGAD65 Peptide Epitopes, 2002, Tissue Antigens 59: 101-112.
Harrison, The Prospect of Vaccination to Prevent Type 1 Diabetes, Human Vaccines 1:4, 143-150, Jul./Aug. 2005.
Heijmans et al., Encephalitogenic and Tolerogenic Potential of Altered Peptide Ligands of MOG and PLP in Biozzi ABH Mice, Journal of Neuroimmunology 167 (2005) 23-33.
Nishio et al., Response to Comment on Nishio et al. on Diabetes Reversal in NOD Mice, Science, 2006, vol. 314, No. 5803, p. 1243.

* cited by examiner

*Primary Examiner* — Gerald R Ewoldt
(74) *Attorney, Agent, or Firm* — MacMillan, Sobanski & Todd, LLC

(57) ABSTRACT

Modified GAD65 compositions antagonize the activities of islet-specific T cells that contribute to the progression of one or more autoimmune disorders. The compositions are also antagonistic in humanized mice that express human HLA alleles associated with increased-risk of Type 1 diabetes.

3 Claims, 7 Drawing Sheets

GAD546-554

GAD505-513

| | | |
|---|---|---|
| APVIKARMMEYGTTMV-S-Y-Q-P-L-G-D-K-V-N-F | GAD65(531-556) | SEQ. ID: 1 |
| S-Y-Q-P-L-G-D-K-V | APL-61 | SEQ. ID: 2 |
| A-Y-Q-P-L-G-D-K-V | APL-62 | SEQ. ID: 3 |
| S-A-Q-P-L-G-D-K-V | APL-63 | SEQ. ID: 4 |
| S-Y-A-P-L-G-D-K-V | APL-64 | SEQ. ID: 5 |
| S-Y-Q-A-L-G-D-K-V | APL-65 | SEQ. ID: 6 |
| S-Y-Q-P-A-G-D-K-V | APL-66 | SEQ. ID: 7 |
| S-Y-Q-P-L-A-D-K-V | APL-67 | SEQ. ID: 8 |
| S-Y-Q-P-L-G-A-K-V | APL-68 | SEQ. ID: 9 |
| S-Y-Q-P-L-G-D-A-V | APL-69 | SEQ. ID: 10 |
| S-Y-Q-P-L-G-D-K-A | APL-70 | SEQ. ID: 11 |

Fig. 6

| | 546.I.7 | 546.14.69 | 546.14.74 | 546.14.81 | 546.14.86 |
|---|---|---|---|---|---|
| WT | 1 | 1 | 1 | 1 | 1 |
| 63 | 0.96 | 0.95 | 0.97 | 0.95 | 0.97 |
| 64 | 0.78 | 0.57 | 0.71 | 0.36 | 0.53 |
| 65 | 1.00 | 0.89 | 1.00 | 0.80 | 0.84 |
| 66 | 0.50 | 0.21 | 1.00 | 0.14 | 0.18 |
| 67 | 0.84 | 0.20 | 0.87 | 0.15 | 0.17 |
| 68 | 0.90 | 0.88 | 1.06 | 0.99 | 0.97 |
| 69 | 0.91 | 0.11 | 0.12 | 0.17 | 0.14 |
| 70 | 0.83 | 0.11 | 0.11 | 0.16 | 0.13 |
| 71 | 0.93 | 0.12 | 0.66 | 0.16 | 0.15 |
| 72 | 1.03 | 0.83 | 1.03 | 0.95 | 0.95 |
| 73 | 0.71 | 0.13 | 1.00 | 0.16 | 0.14 |
| 74 | 0.78 | 0.13 | 1.02 | 0.17 | 0.12 |
| 75 | 0.93 | 0.13 | 0.14 | 0.18 | 0.13 |
| 76 | 0.82 | 0.12 | 0.14 | 0.17 | 0.14 |
| 77 | 0.94 | 0.18 | 0.17 | 0.19 | 0.26 |
| 258 | 0.97 | 0.68 | 0.83 | 0.77 | 0.80 |
| 259 | 1.00 | 0.12 | 0.15 | 0.18 | 0.16 |
| 260 | 0.89 | 0.11 | 0.14 | 0.15 | 0.13 |
| 261 | 0.91 | 0.12 | 0.15 | 0.16 | 0.13 |
| 262 | 0.90 | 0.75 | 1.00 | 0.77 | 0.83 |
| 263 | 1.08 | 0.93 | 1.04 | 1.01 | 1.04 |
| 264 | 1.00 | 0.52 | 0.62 | 0.66 | 0.61 |
| 265 | 0.74 | 0.56 | 0.93 | 0.66 | 0.66 |
| 266 | 0.89 | 0.13 | 0.42 | 0.23 | 0.21 |
| 267 | 0.93 | 0.11 | 0.13 | 0.19 | 0.17 |
| 268 | 0.92 | 0.11 | 0.12 | 0.15 | 0.13 |
| CTL alone | 0.46 | 0.11 | 0.13 | 0.17 | 0.19 |
| CTL/APC | 0.97 | 0.12 | 0.13 | 0.15 | 0.17 |
| APC alone | 0.23 | 0.12 | 0.14 | 0.16 | 0.14 |

Fig. 9A

| | I.7 | 14.69 | 14.74 | 14.81 | 14.86 |
|---|---|---|---|---|---|
| 62 | 1.00 | 1.00 | 1.00 | 1.00 | 1.00 |
| 63 | 1.04 | 0.90 | 0.82 | 0.88 | 0.92 |
| 64 | 0.49 | 0.39 | 0.44 | 0.21 | 0.42 |
| 65 | 1.05 | 0.65 | 0.91 | 0.75 | 0.87 |
| 66 | 0.35 | 0.21 | 0.94 | 0.16 | 0.18 |
| 67 | 0.21 | 0.20 | 0.62 | 0.16 | 0.20 |
| 68 | 0.18 | 1.13 | 1.06 | 0.99 | 1.08 |
| 69 | 0.19 | 0.22 | 0.19 | 0.21 | 0.19 |
| 70 | 0.17 | 0.17 | 0.14 | 0.16 | 0.13 |
| 71 | 0.22 | 0.21 | 0.39 | 0.16 | 0.16 |
| 72 | 1.13 | 0.97 | 0.96 | 0.95 | 1.06 |
| 73 | 0.26 | 0.19 | 0.90 | 0.16 | 0.16 |
| 74 | 0.85 | 0.21 | 0.93 | 0.16 | 0.16 |
| 75 | 0.15 | 0.20 | 0.15 | 0.16 | 0.17 |
| 76 | 0.18 | 0.22 | 0.17 | 0.17 | 0.17 |
| 77 | 0.19 | 0.22 | 0.19 | 0.18 | 0.17 |
| 258 | 0.96 | 0.65 | 0.86 | 0.67 | 0.85 |
| 259 | 0.18 | 0.21 | 0.18 | 0.16 | 0.18 |
| 260 | 0.16 | 0.20 | 0.16 | 0.18 | 0.16 |
| 261 | 0.24 | 0.22 | 0.20 | 0.18 | 0.18 |
| 262 | 1.14 | 0.76 | 1.01 | 0.83 | 0.90 |
| 263 | 1.27 | 1.14 | 1.04 | 1.03 | 1.19 |
| 264 | 1.11 | 0.46 | 0.42 | 0.55 | 0.61 |
| 265 | 0.79 | 0.49 | 0.81 | 0.53 | 0.67 |
| 266 | 0.20 | 0.25 | 0.31 | 0.18 | 0.20 |
| 267 | 0.19 | 0.22 | 0.19 | 0.18 | 0.20 |
| 268 | 0.14 | 0.17 | 0.14 | 0.16 | 0.14 |
| clone | 0.16 | 0.18 | 0.14 | 0.15 | 0.16 |
| APC | 0.15 | 0.21 | 0.16 | 0.17 | 0.16 |
| clone/APC | 0.14 | 0.19 | 0.14 | 0.15 | 0.16 |

Fig. 9B

ALTERED PEPTIDE LIGANDS OF GAD65

CROSS-REFERENCE TO RELATED APPLICATIONS AND STATEMENT REGARDING SPONSORED RESEARCH

The present invention claims the benefit of the PCT/US07/008980 filed Mar. 30, 2007, which claims priority to the provisional patent application Ser. No. 60/789,236 filed Apr. 4, 2006. This invention was not made with any government support and the government has no rights in this invention.

INCORPORATION OF SEQUENCE LISTING

A sequence listing and a computer-readable form of the sequence listing was concurrently filed with the PCT Application No. PCT/US07/008980 filed Mar. 20, 2007, containing the file named "Quinn.prj WorkFile.txt", which is 4 KB (measured in MS-DOS) and which was created on Mar. 30, 2007, which is herein incorporated by reference. A corrected sequence listing and a computer-readable form of the sequence listing was filed with the PCT Application No. PCT/US07/008980, containing the file named "Quinn.prj ST25.txt", which is 2 KB (measured in MS-DOS) and which was created on Jul. 26, 2007, which is herein incorporated by reference.

BACKGROUND OF THE INVENTION

An autoimmune disease is generally described as a chronic condition in which the immune response targets molecules associated with healthy cells and tissue. In an autoimmune disease, some component of the immune system interferes with normal cell functions. Also, the ability to repair the damaged tissue cannot keep pace with the rate of tissue destruction.

An estimated 18.2 million people in the US have diabetes, which is now considered to be an organ-specific autoimmune disease. Further, it is estimated that 5.2 million have not been diagnosed. Type 1 diabetes accounts for 5-10% of the cases of diabetes; i.e., about 1.8 million people. In 2002, diabetes cost the US $132 billion: $40 billion in indirect costs-lost wages, premature death, disability payments, and $92 billion in direct costs. Risks for developing Type 1 diabetes include genetic predisposition and possible environmental factors.

In the pancreas, the islets of Langerhans contain several cell types that secrete distinct hormones. Each cell type expresses different tissue-specific proteins: a cells express glucagon; β cells express insulin; and, δ cells express somatostatin. In insulin-dependent diabetes an effector T cell recognizes peptides from a β cell-specific protein and kills the β cells. Glucagon and somatostatin are still produced by the α and δ cells, but no insulin can be made.

Type 1 diabetes is mediated by autoreactive T cells that induce inflammations in the pancreatic islets and selectively destroy the insulin-producing β cells in the pancreas. The immune-mediated destruction of insulin-producing cells in the pancreas leads to dangerously high levels of glucose in the blood. There is a need to be able to control the pathogenic activities of islet-specific T cells to ameliorate the onset and progression of Type 1 diabetes.

Also, there is a need to be able to control the pathogenic activities of such islet-specific, T cells to provide protection from recurrent diabetes in individuals receiving islet transplants.

SUMMARY OF THE INVENTION

A modified glutamic acid decarboxylase (GAD) composition antagonizes the activities of islet-specific T cells which contribute to the progression of diabetes, and also is antagonistic in humanized mice that express human HLA alleles associated with increased-risk of Type 1 diabetes.

In one aspect, there is provided a modified glutamic acid decarboxylase composition (GAD65) that includes at least one altered peptide ligand (APL) that antagonizes the islet-specific T cells which contribute to the progression of one or more autoimmune disorders. The GAD65 composition is also antagonistic in humanized mice that express human ILA alleles associated with increased-risk of the autoimmune disorder.

In one specific aspect, there is provided herein a composition that comprises one or more altered peptide ligands (APL) which bind the Kd MHC class I molecule. In a particular aspect, the composition comprises one or more altered peptide ligands (APLs) of glutamic acid decarboxylase (GAD 546-554). In specific embodiments, the modified glutamic acid decarboxylase comprises one or more of the amino acid sequences:

| | |
|---|---|
| [SEQ.ID No. 2] | S-Y-Q-P-L-G-D-K-V |
| [SEQ.ID No. 3] | A-Y-Q-P-L-G-D-K-V |
| [SEQ.ID No. 4] | S-A-Q-P-L-G-D-K-V |
| [SEQ.ID No. 5] | S-Y-A-P-L-G-D-K-V |
| [SEQ.ID No. 6] | S-Y-Q-A-L-G-D-K-V |
| [SEQ.ID No. 7] | S-Y-Q-P-A-G-D-K-V |
| [SEQ.ID No. 8] | S-Y-Q-P-L-A-D-K-V |
| [SEQ.ID No. 9] | S-Y-Q-P-L-G-A-K-V |
| [SEQ.ID No. 10] | S-Y-Q-P-L-G-D-A-V |
| [SEQ.ID No. 11] | S-Y-Q-P-L-G-D-K-A |

In another aspect, there is provided herein a nucleotide sequence encoding a modified glutamic acid decarboxylase according to one of SEQ. ID Nos. 3 to 11. In other aspects, the present invention relates to a vector containing at least one nucleotide sequence as described herein. In a further aspect, there is provided herein a host cell that contains one or more such vectors. There is also provided herein a procedure for producing a modified glutamic acid decarboxylase by cultivating such host cell.

In a further aspect, there is provided herein a method for predicting, preventing and/or treating autoimmune disorders. Such method includes administering to a human or animal in need thereof, an effective amount of a modified glutamic acid decarboxylase as described herein in an amount effective to predict, treat and/or prevent the autoimmune disorder.

In a further aspect, there is provided herein a method for delivering activation or antagonistic signals when target cells express the human HLA-A2 allele by administering an effective amount of one or more of the compositions as described herein. Also provided herein is a method for therapeutically down regulating the activities of pathogenic islet specific T cells by administering an effective amount of one or more of the compositions described herein.

In yet another aspect, there is provided herein a method for targeting GAD65 reactive T lymphocytes to alter the course of Type 1 diabetes by administering an effective amount of one or more of the compositions described herein.

In yet another aspect, there is provided herein a method for altering the ability of T cells to proliferate and produce cytokines administering an effective amount of one or more of the compositions described herein.

In yet another aspect, there is provided herein a method for identifying relevant fragments that bind to HLA-A2 by using a NOD mouse model (Kd+). The NOD mouse model, Kd, can be used to predict fragments from other clinically relevant proteins which may bind to HLA-A2.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

FIG. 6 shows the APLs of GAD 546-554 [SEQ. ID Nos. 2-11].

FIGS. 9A and 9B show that mouse (Kd) and human (HLA-A2) bind similar peptides and are recognized by specific cytotoxic T lymphocytes (CTL).

DESCRIPTION OF THE INVENTION

Certain types of T cells, helper T cells (Th) and cytotoxic T lymphocytes (CTL) cells, recognize peptides bound to major histocompatibility complex (MHC class II and class I) molecules, respectively, and are each involved in the pathology of diabetes; however, islet cells only express peptides recognized by CTL.

The pathogenic activities of Th and CTL can be modulated or antagonized if the cells are exposed to altered forms of the natural peptides for which they are specific. Altered peptide ligands (APL) are peptide fragments that are closely related to the natural sequence; however, the APLs induce only a partial response in protein-specific lymphocytes. Stimulation with APLs can alter the ability of T cells to proliferate and produce cytokines.

Although certain MHC class I and class II alleles are associated with heightened risk of Type 1 diabetes, the challenge in human therapy has been the identification of appropriate APLs since the ability to perform in vitro studies are limited in scope and feasibility.

This is of importance since several islet proteins are targeted in the immune mediated attack against the insulin-producing islet cells in Type 1 diabetes. Immune responses to several β-cell proteins, including glutamic acid decarboxylase (GAD65), are indicative of Type 1 diabetes. T cell responses to selected fragments of GAD65 are associated with progression of diabetes in humans and non-obese diabetic (NOD) mice. Immune responses to GAD65 occur years before the onset of diabetes. Such responses can be used to predict susceptibility to Type 1 diabetes in prediabetic individuals and to discriminate Type 1 diabetes from Type 2 diabetes.

In one aspect, the present invention relates to modified GAD65 compositions which antagonize the activities of islet-specific T cells that contribute to the progression of diabetes. These modified GAD65 compositions are also antagonistic in humanized mice that express human HLA alleles associated with increased-risk of type 1 diabetes The modified GAD compositions comprise both novel peptides and altered peptide ligands (APL) which are used to express the Kd MHC class I molecule.

In another aspect, the modified GAD65 compositions (i.e., novel peptides and APL compositions) are able to deliver similar activation or antagonistic signals when target cells express the human HLA-A2 allele, which is known to be associated with increased risk of diabetes. This was an unexpected finding since there was no reason to expect that the mouse and human compositions would behave similarly. Murine Kd expressing cells are useful to define relevant HLA-A2 binding peptides for therapeutic uses in other autoimmune diseases, cancer, and infectious diseases.

Figure 1:
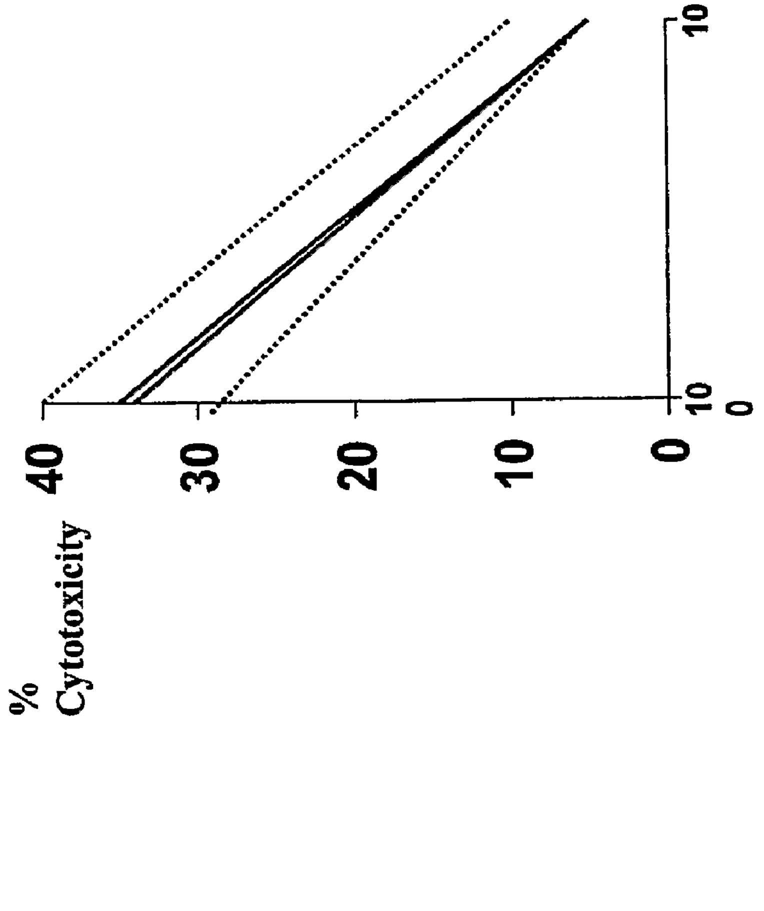
FIGS. 1 and 2 are graphs showing that spleen cells from young prediabetic NOD mice are cytotoxic for target cells pulsed with GAD peptides.
Figure 2:
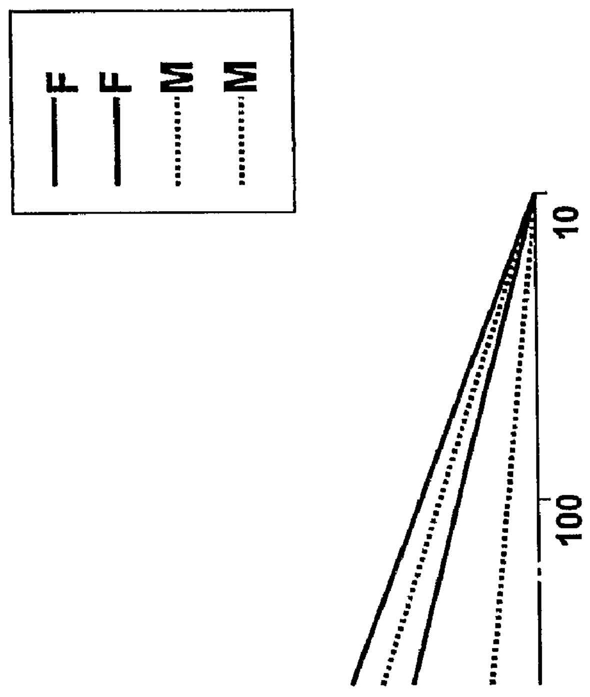

Referring now to the FIGS. 1 and 2, the GAD65 fragment 546-554 is shown to be important in non-obese diabetic (NOD) mice. Spleen cells from young prediabetic NOD mice are cytotoxic for target cells pulsed with GAD peptides, as shown in the data presented in FIGS. 1 and 2. (Effector: target P815).

Figure 4:
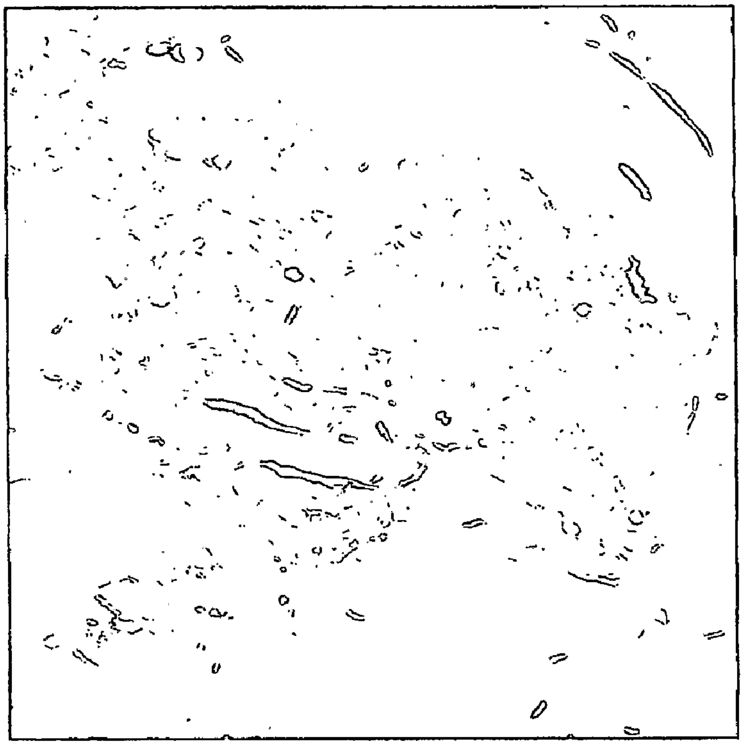
FIGS. 3 and 4 are photographs showing that T cells which recognize a GAD546-554 fragment can cause β cell damage.
Figure 3:
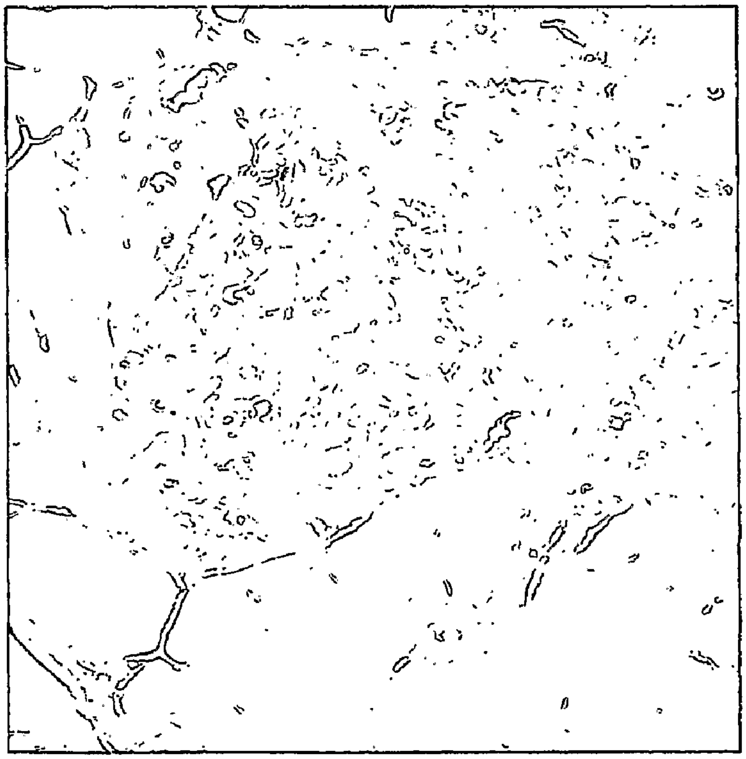

FIGS. 3 and 4 show that T cells which recognize GAD546-554 can cause β cell damage, where the CTL line 546-14 transfers invasive insulitis into diabetes resistant NOD.SCID mice.

Figure 5:
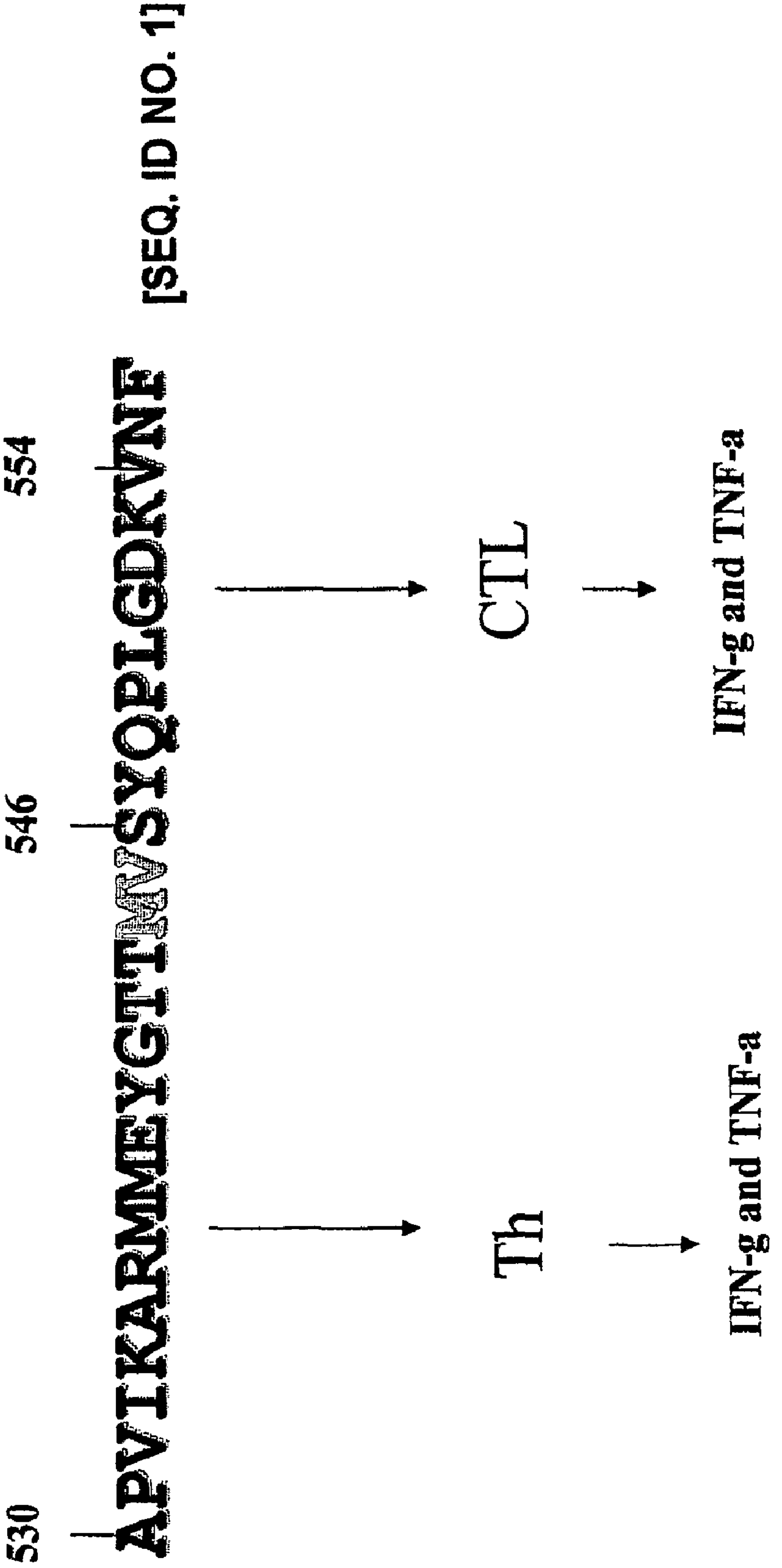
FIG. 5 is an amino acid sequence of GAD65 (531-556) [SEQ. ID No. 1].

GAD65 reactive T lymphocytes are targeted in order to alter the course of Type 1 diabetes. FIG. 5 shows the target areas for specific lymphocytes. The activities of diabetes-inducing lymphocytes can be blocked by the 546-554 fragment of GAD65.

FIG. 6 shows the amino acid sequences of modified GAD65 compositions which are APLs of GAD 546-554 [Seq. ID No. 2-11], labeled APL61 through APL70.

Treatments which reduce GAD65 response can ameliorate Type 1 diabetes in NOD mice (spontaneous responses in NOD and NOD.HLA.A2 mice; the GAD65 546-554 fragments bind Kd and HLA.A2). Unlike the GAD65 molecule, the APL compositions can target a specific set of T cells and reduce the risk of accidental activation of pathogenic T cells.

Figure 7:
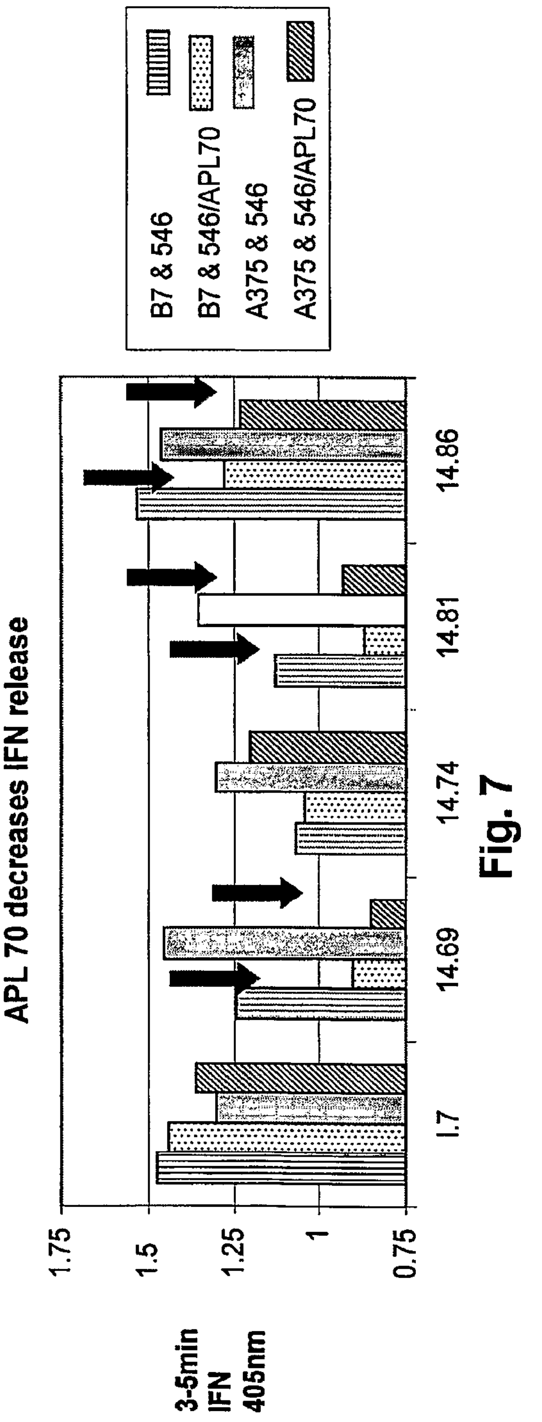
FIG. 7 is a graph showing one altered peptide ligand composition, APL-70, decreases IFN release.

FIG. 7 is a graph which shows one modified GAD65 composition, APL-70, [Seq. ID No.: 11] decreases IFN release in various CLT clones. Table I below shows:

| Percent Reduction for | B7 | A375 |
|---|---|---|
| clone 14.69 | 27% | 41% |
| clone 14.81 | 23% | 31% |
| clone 14.86 | 17% | 16% |

Figure 8:
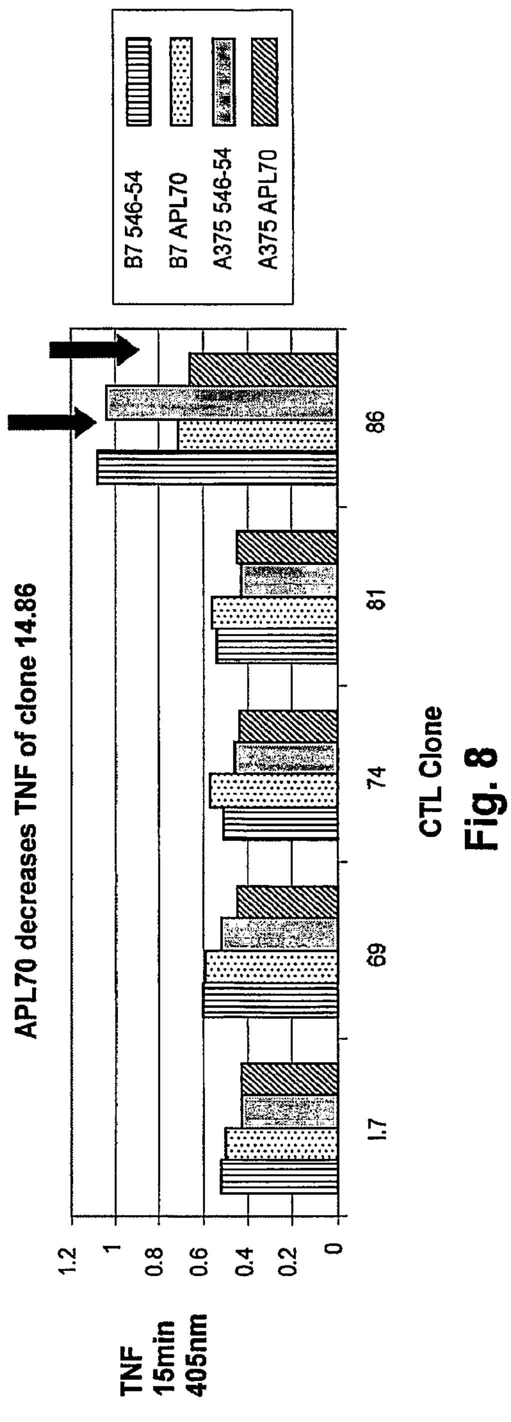
FIG. 8 is a graph showing one altered peptide ligand composition, APL-70, decreases THF release.

FIG. 8 is a graph which shows that APL-70 [Seq. ID No.: 11] decreases THF of CTL clone 14.86. Also, Table 2 below shows:

| Percent Reduction for | B7 | A375 |
|---|---|---|
| clone 14.86 | 34% | 37% |

The mouse (Kd) and human (HLA-A2) are associated with increased risk of Type 1 diabetes. Surprisingly, mouse (Kd)

and human (HLA-A2) bind similar peptides and are recognized by 546-specific CTL, as shown in the data in FIG. 9.

In another aspect of the present invention, the modified GAD65 APL compositions, (and, in particular, APL 70) can be useful to treat Type 1 diabetes in humans. Also, treatments can be developed using the APL compositions to prevent Type 1 diabetes or to aid in the success of islet transplants.

In another aspect of the present invention, NOD mouse model (Kd+) is useful to identify relevant protein fragments that bind to HLA-A2. In certain embodiments, the GAD65 546-554 fragment is useful to predict susceptibility to Type 1 diabetes. It is to be noted that, until now, current approaches using human responses have been difficult.

The modified GAD65 APL compositions can be therapeutically used in human diabetes to down regulate the activities of pathogenic islet specific T cells. Also, the modified GAD65 APL compositions can be readily adapted to the detection and treatment of other diseases such as other autoimmune disorders, cancer, and transplant rejections.

In another aspect, the present invention relates to vectors and host cells comprising the above-mentioned amino acids encoding the APLs. The amino acids may be readily introduced into a wide variety of host cells. Representative examples of such host cells include plant cells, eukaryotic cells and prokaryotic cells. In certain embodiments, the amino acid molecules are introduced into cells from an insect or a vertebrate or warm-blooded animal, such as a human, dog, cow, horse, pig, sheep, rat, hamster, mouse, or a fish, or any hybrid thereof.

The amino acid molecules (or vectors) may be introduced into host cells by a wide variety of mechanisms, including for example calcium phosphate-mediated transfection, lipofection; gene gun, electroporation, retroviral, adenoviral protoplast-mediated transfection or DEAE-dextran mediated transfection, as well as baculovirus transfection.

The present invention also provides a variety of pharmaceutical compositions for predicting, treating and/or preventing autoimmune diseases. The pharmaceutical compositions include a pharmaceutically active amount of the modified GAD APL compositions along with a pharmaceutically or physiologically acceptable carrier, excipients or diluents. Generally, such carriers should be non-toxic to recipients at the dosages and concentrations employed. Such compositions are ordinarily prepared by combining the therapeutic agent with such additional ingredients as, but not limited to, buffers, antioxidants such as ascorbic acid, polypeptides, proteins, amino acids, carbohydrates including glucose, sucrose or dextrins, chelating agents such as EDTA, glutathione and other stabilizers and excipients.

In addition, the pharmaceutical compositions of the present invention may be prepared for administration by a variety of routes, including for example orally, sublingually, intradermally, intramuscularly, intraocularly, intraperitoneally, intravenously or subcutaneously. The compositions can occur as tablets, sublingual tablets, granules, pills, capsules, solutions, syrups, mixtures, emulsions, aerosols, and the like.

Furthermore, the above-mentioned modified GAD65 compositions can be used as pharmaceuticals and directly be injected into a human or animal in need of such treatment by using a gene gun. The treated human or animal body is then able to synthesize the modified GAD65 APL compositions.

In still another aspect, the present invention relates to a method of using the modified GAD65 APL compositions as diagnostic and/or predictive assays or reagents for screening for the presence of GAD antibodies in a sample. The sample is contacted with one or more of the modified GAD65 APL compositions. The detection of binding or interaction between an antibody or cell in the sample and the modified GAD65 APL compositions indicates the presence of GAD-specific autoimmune mechanisms in the sample. The method is also useful for the screening of a subject at risk of developing an autoimmune disorder, and for determining if the subject has an autoimmune disorder.

In another aspect, the present invention relates to a method to predict, prevent and/or treat autoimmune disorders by inducing a tolerance to the modified GAD65 APL compositions as well as using the modified GAD65 APL compositions for treatment of the disorders. The method can be useful for all or certain population segments and can be adapted to individuals with a genetic predisposition for autoimmune disorders and to individuals with an increased antibody titer against the modified GAD65 APL compositions.

The method can also be used with patients with developed autoimmune disorders to eliminate the possibility of renewed autoimmune attacks, for example, after pancreas or islet cell transplantation.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

All scientific and patent publications referenced herein are hereby incorporated by reference. The invention having now been described by way of written description and example, those of skill in the art will recognize that the invention can be practiced in a variety of embodiments, that the foregoing description and example is for purposes of illustration and not limitation of the following claims.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A modified glutamic acid decarboxylase GAD65 composition comprising at least one altered peptide ligand (APL) that antagonizes islet-specific T cells, wherein one or more altered peptide ligands comprises SEQ ID NO: 11.

2. The composition of claim 1, wherein the SEQ ID NO: 11 binds the Kd MHC class I molecule.

3. A modified glutamic acid decarboxylase comprising an amino acid sequence selected from the group consisting of: [SEQ.ID No.3] A-Y-Q-P-L-G-D-K-V; [SEQ.ID No.4] S-A-Q-P-L-G-D-K-V; [SEQ.ID No.5] S-Y-A-P-L-G-D-K-V; sequence [SEQ.ID No.6] S-Y-Q-A-L-G-D-K-V; [SEQ.ID No.7] S-Y-Q-P-A-G-D-K-V; [SEQ.ID No.8] S-Y-Q-P-L-A-D-K-V; [SEQ.ID No.9] S-Y-Q-P-L-G-A-K-V; [SEQ.ID No.10] S-Y-Q-P-L-G-D-A-V; and [SEQ.ID No.11] S-Y-Q-P-L-G-D-K-A.

* * * * *

SEQUENCE LISTING

```
<160> NUMBER OF SEQ ID NOS: 11

<210> SEQ ID NO 1
<211> LENGTH: 27
<212> TYPE: PRT
<213> ORGANISM: Artificial Sequence
<220> FEATURE:
<223> OTHER INFORMATION: Description of Artificial Sequence: Synthetic
      peptide
```

<400> SEQUENCE: 1

Ala Pro Val Ile Lys Ala Arg Met Met Glu Tyr Gly Thr Thr Met Val
1 5 10 15

Ser Tyr Gln Pro Leu Gly Asp Lys Val Asn Phe
20 25

<210> SEQ ID NO 2
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 2

Ser Tyr Gln Pro Leu Gly Asp Lys Val
1 5

<210> SEQ ID NO 3
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 3

Ala Tyr Gln Pro Leu Gly Asp Lys Val
1 5

<210> SEQ ID NO 4
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 4

Ser Ala Gln Pro Leu Gly Asp Lys Val
1 5

<210> SEQ ID NO 5
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 5

Ser Tyr Ala Pro Leu Gly Asp Lys Val
1 5

<210> SEQ ID NO 6
<211> LENGTH: 9
<212> TYPE: PRT
<213> ORGANISM: Artificial Sequence
<220> FEATURE:
<223> OTHER INFORMATION: Description of Artificial Sequence: Synthetic peptide

<400> SEQUENCE: 6

Ser Tyr Gln Ala Leu Gly Asp Lys Val
1 5

<210> SEQ ID NO 7

```
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 7

Ser Tyr Gln Pro Ala Gly Asp Lys Val
1               5


<210> SEQ ID NO 8
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 8

Ser Tyr Gln Pro Leu Ala Asp Lys Val
1               5


<210> SEQ ID NO 9
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 9

Ser Tyr Gln Pro Leu Gly Ala Lys Val
1               5


<210> SEQ ID NO 10
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Ser Tyr Gln Pro Leu Gly Asp Ala Val
1               5


<210> SEQ ID NO 11
<211> LENGTH: 9
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 11

Ser Tyr Gln Pro Leu Gly Asp Lys Ala
1               5
```